(12) United States Patent
Nakamura et al.

(10) Patent No.: US 10,359,890 B2
(45) Date of Patent: Jul. 23, 2019

(54) TOUCH SCREEN, TOUCH PANEL, AND DISPLAY APPARATUS

(71) Applicant: Mitsubishi Electric Corporation, Tokyo (JP)

(72) Inventors: Tatsuya Nakamura, Tokyo (JP); Takeshi Ono, Tokyo (JP); Tae Orita, Tokyo (JP); Takashi Miyayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 762 days.

(21) Appl. No.: 14/919,925

(22) Filed: Oct. 22, 2015

(65) Prior Publication Data

US 2016/0139707 A1 May 19, 2016

(30) Foreign Application Priority Data

Nov. 14, 2014 (JP) ................................ 2014-231375

(51) Int. Cl.
*G06F 3/044* (2006.01)
*G06F 3/047* (2006.01)

(52) U.S. Cl.
CPC .... *G06F 3/044* (2013.01); *G06F 2203/04112* (2013.01)

(58) Field of Classification Search
CPC .................. G06F 3/044; G06F 2230/04112
See application file for complete search history.

(56) References Cited

U.S. PATENT DOCUMENTS

| | | |
|---|---|---|
| 5,844,506 A | 12/1998 | Binstead |
| 6,137,427 A | 10/2000 | Binstead |
| 6,452,514 B1 | 9/2002 | Philipp |
| RE40,867 E | 8/2009 | Binstead |
| 8,269,744 B2 | 9/2012 | Agari et al. |
| 8,390,598 B2 | 3/2013 | Agari et al. |
| 2004/0017362 A1* | 1/2004 | Mulligan ............... G06F 3/044 345/173 |
| 2009/0090694 A1* | 4/2009 | Hotelling ............... G06F 3/044 216/41 |

(Continued)

FOREIGN PATENT DOCUMENTS

| | | |
|---|---|---|
| JP | 09-511086 | 11/1997 |
| JP | 2003-526831 | 9/2003 |

(Continued)

OTHER PUBLICATIONS

An Office Action mailed by the Japanese Patent Office dated Jun. 5, 2018, which corresponds to Japanese Patent Application No. 2014-231375 and is related to U.S. Appl. No. 14/919,925.

*Primary Examiner* — Amare Mengistu
*Assistant Examiner* — Jennifer L Zubajlo
(74) *Attorney, Agent, or Firm* — Studebaker & Brackett PC

(57) ABSTRACT

A lower electrode and an upper electrode have crossing portions where first element wiring of a mesh of the lower electrode and second element wiring of a mesh of the upper electrode cross each other in three dimensions. The lower electrode includes row-direction wiring and a floating electrode that are insulated from each other by disconnected portions provided to the first element wiring other than the crossing portions. The upper electrode includes column-direction wiring and a floating electrode that are insulated from each other by disconnected portions provided to the second element wiring other than the crossing portions.

7 Claims, 14 Drawing Sheets

(56) References Cited

U.S. PATENT DOCUMENTS

| | | | |
|---|---|---|---|
| 2010/0090979 A1* | 4/2010 | Bae | G06F 3/0416 345/174 |
| 2010/0302204 A1* | 12/2010 | Miyayama | G06F 3/0418 345/174 |
| 2013/0222325 A1* | 8/2013 | Cok | G06F 3/044 345/174 |
| 2013/0242485 A1 | 9/2013 | Ohtani et al. | |
| 2013/0327560 A1* | 12/2013 | Ichiki | G06F 3/044 174/133 R |
| 2014/0063374 A1* | 3/2014 | Kuriki | G06F 3/044 349/12 |
| 2014/0144679 A1 | 5/2014 | Hwang et al. | |
| 2014/0151098 A1 | 6/2014 | Hwang et al. | |
| 2014/0152916 A1* | 6/2014 | Nakamura | G06F 3/044 349/12 |
| 2014/0299361 A1 | 10/2014 | Nakamura et al. | |
| 2015/0242013 A1* | 8/2015 | Ono | G06F 3/044 345/174 |

FOREIGN PATENT DOCUMENTS

| | | | | |
|---|---|---|---|---|
| JP | 2010-061502 | 3/2010 | | |
| JP | 2010-097536 A | 4/2010 | | |
| JP | 2012-103761 | 5/2012 | | |
| JP | 2012-256320 | 12/2012 | | |
| JP | 2013-149236 A | 8/2013 | | |
| JP | WO 2014050306 A1 * | 4/2014 | | G06F 3/044 |
| JP | 2014-109997 | 6/2014 | | |
| JP | 2014-526100 A | 10/2014 | | |
| WO | 95/27334 | 10/1995 | | |
| WO | 00/44018 | 7/2000 | | |
| WO | 2014/050306 A1 | 4/2014 | | |

* cited by examiner

F I G . 4
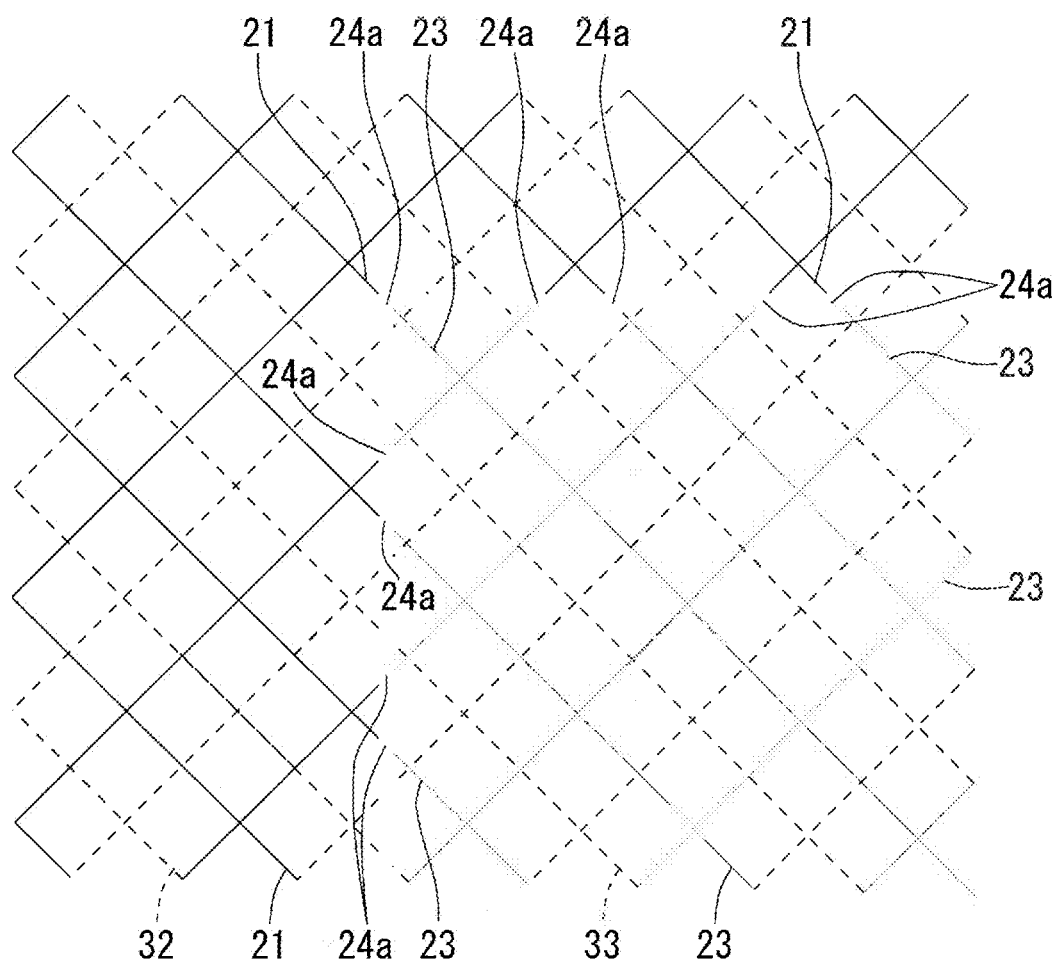

F I G . 5
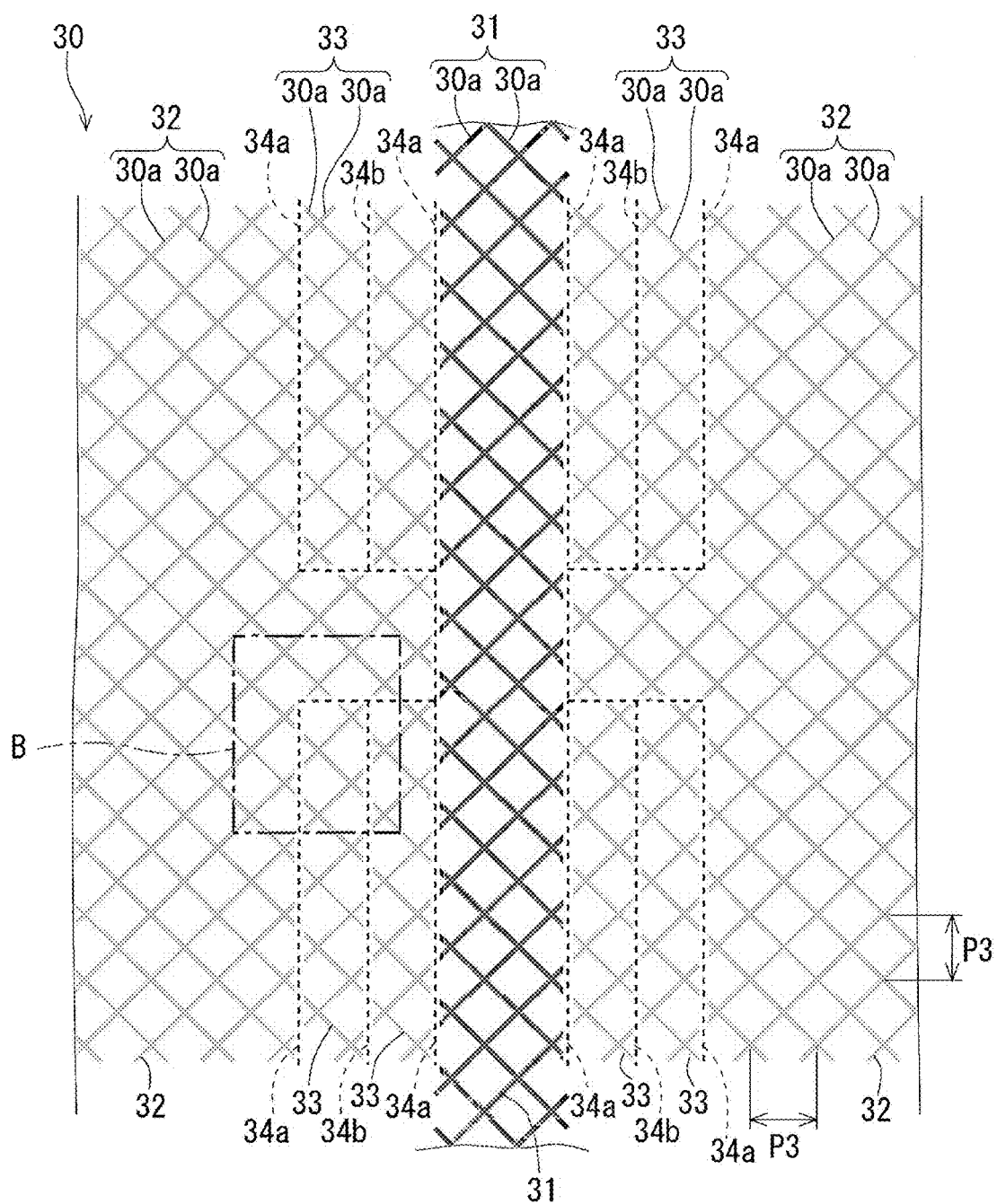

F I G . 6
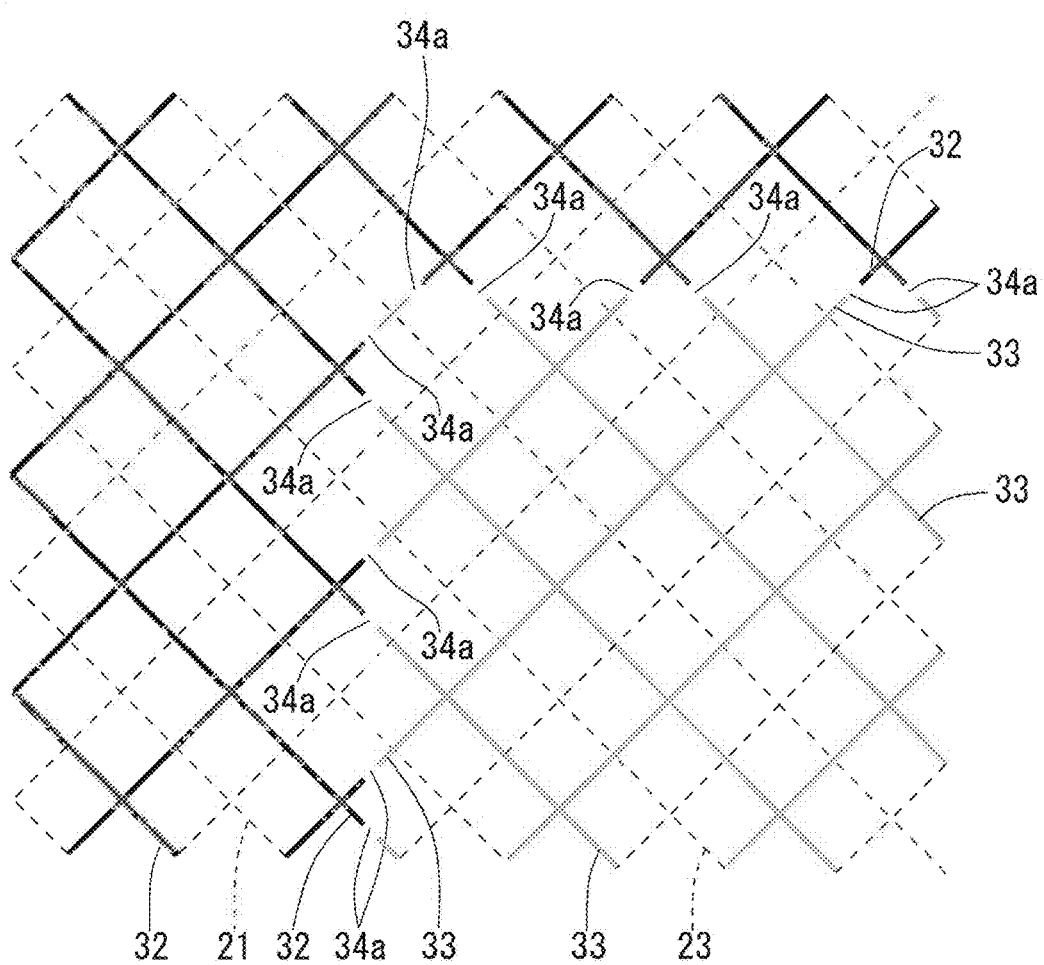

F I G . 8
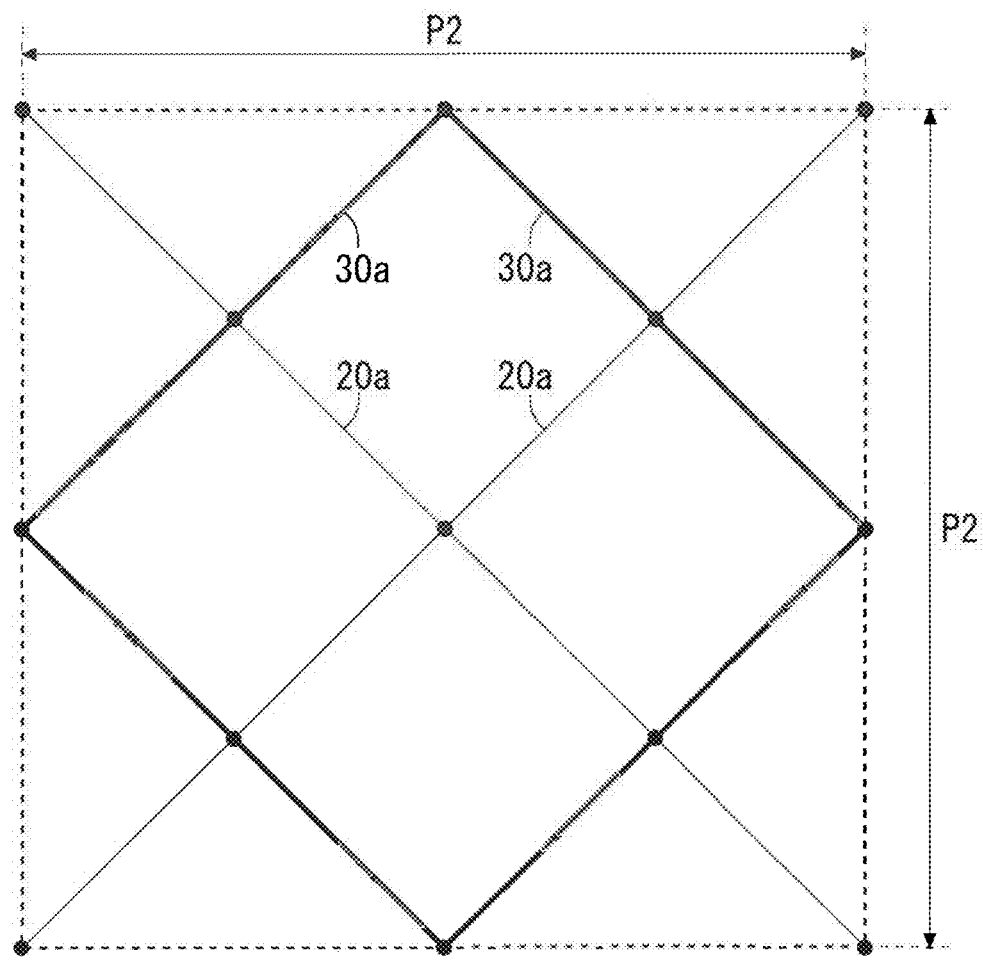

F I G . 9
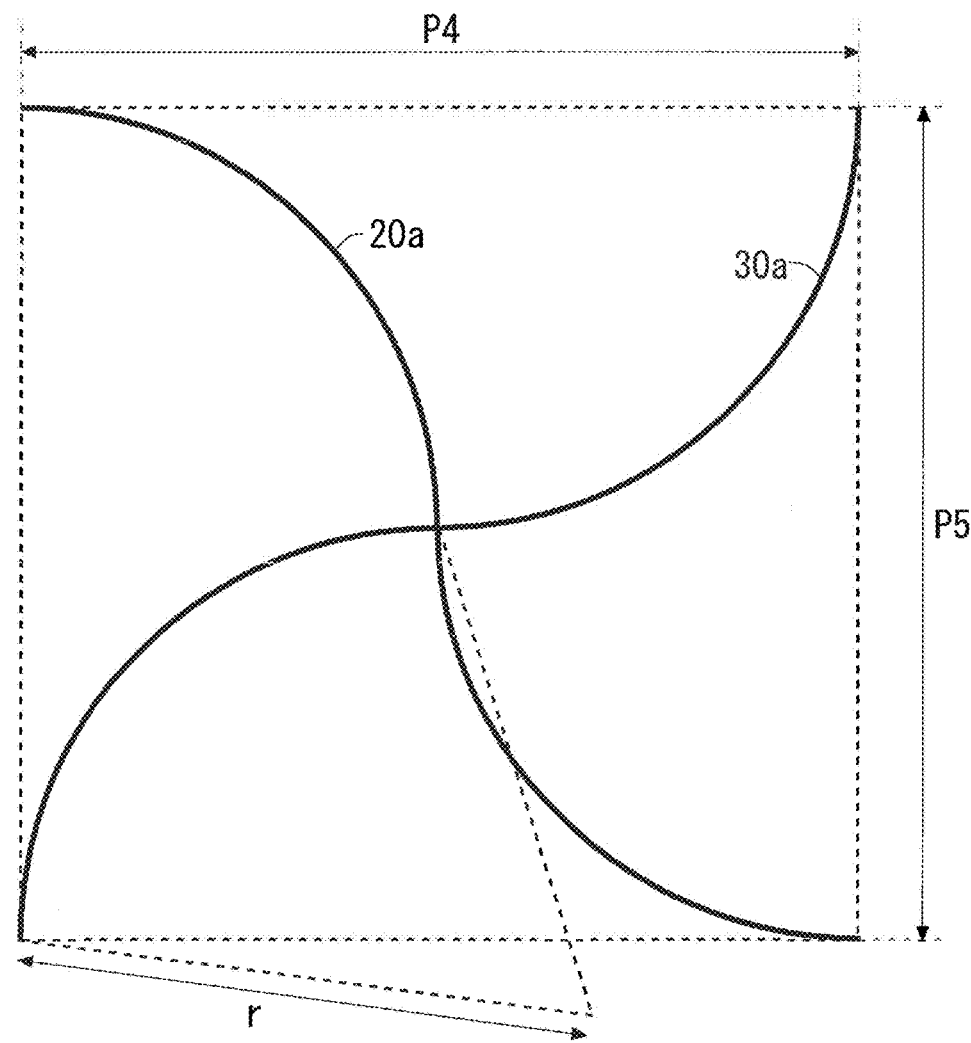

F I G . 1 0
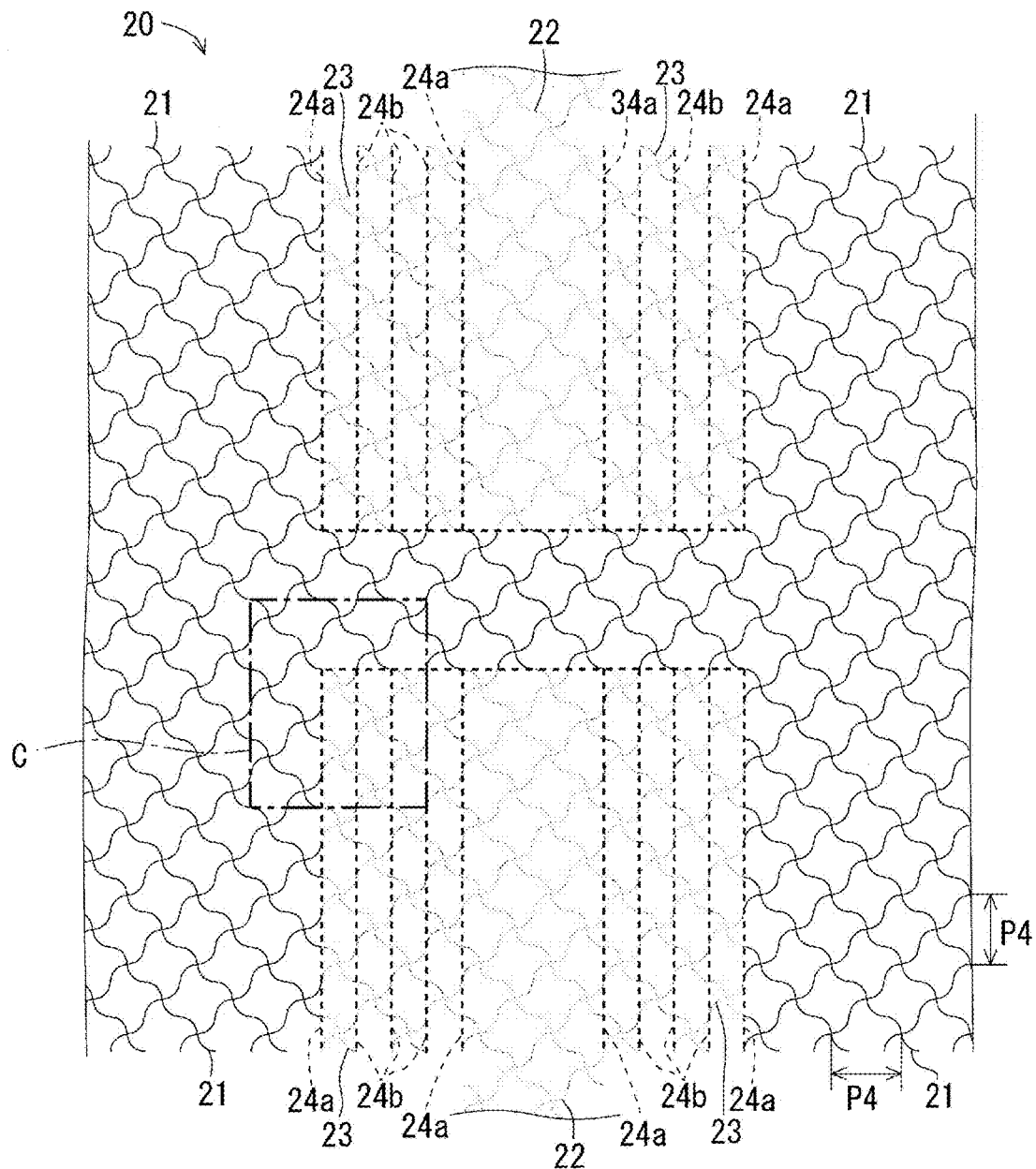

F I G. 1 1
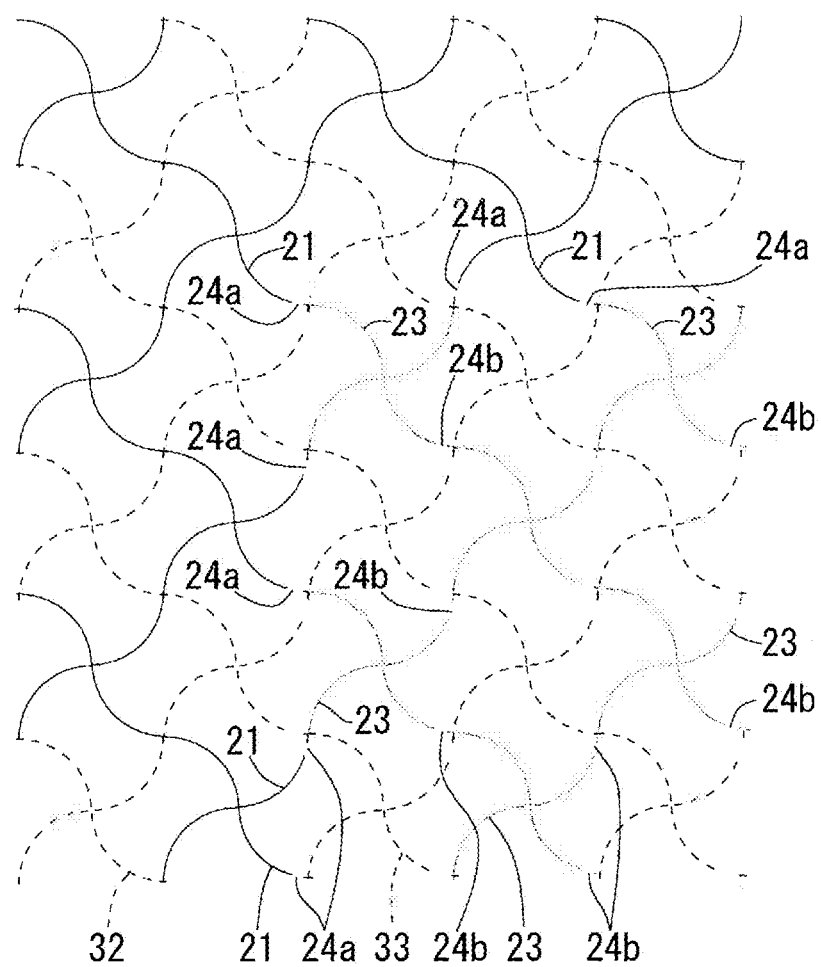

F I G . 1 3
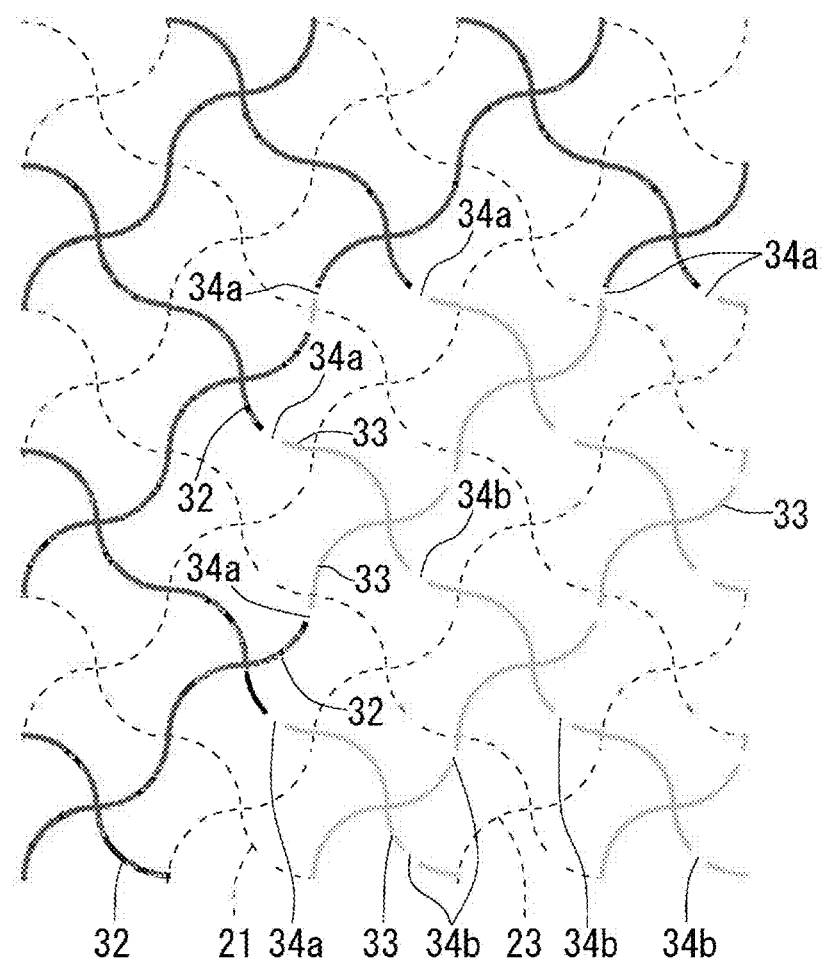

TOUCH SCREEN, TOUCH PANEL, AND DISPLAY APPARATUS

BACKGROUND OF THE INVENTION

Field of the Invention

The present invention relates to a touch screen that can detect a touch, and a touch panel and a display apparatus that include the touch screen.

Description of the Background Art

A touch panel is an apparatus that detects a touch of an indicator such as a finger and specifies coordinates of a position of the touch on the touch panel, and is attracting attention as one of excellent user interface means. Various types of touch panels, such as a resistive film touch panel and a capacitive touch panel, are commercially available now. A touch panel typically includes a touch screen with a built-in touch sensor (sensor that detects a touch), and a detection circuit (detection device) that specifies coordinates of a position of the touch based on a signal input from the touch screen.

A projected capacitive touch panel has been proposed as one type of the capacitive touch panel (e.g., Japanese Patent Application Laid-Open Publication No. 2012-103761). A projected capacitive touch panel as disclosed in Japanese Patent Application Laid-Open Publication No. 2012-103761 can detect a touch even if a front side of a touch screen with a built-in touch sensor is covered with a protective plate, such as a glass plate, having a thickness of approximately a few millimeters. Since the protective plate can be disposed at the front side of the touch screen, such a projected capacitive touch panel is stiff. Furthermore, it can detect a touch by a user even if the user wears a glove. It also has a long life as there is no movable part.

The projected capacitive touch panel includes, as detection wiring for detecting capacitance, a first series of conductor elements formed on a thin dielectric film and a second series of conductor elements formed above the first series of conductor elements via an insulating film (e.g., Japanese Unexamined Patent Application Publication (Translation of PCT Application) No. 9-511086), for example. These series of conductor elements are disposed so as to form a plurality of intersections in a plan view with no electrical contact. In structure as disclosed in Japanese Unexamined Patent Application Publication (Translation of PCT Application) No. 9-511086, a detection circuit detects capacitance formed between an indicator such as a finger and the first series of conductor elements and the second series of conductor elements as the detection wiring to specify coordinates of a position of a touch of the indicator. Such a method for detecting coordinates of a position is commonly referred to as a self-capacitance detection method.

There is a method of detecting a change in electric field, i.e., a change in mutual capacitance, between a plurality of row-direction wires extending in a row direction and constituting a first electrode and a plurality of column-direction wires extending in a column direction and constituting a second electrode to specify coordinates of a position of a touch (e.g., Japanese Unexamined Patent Application Publication (Translation of PCT Application) No. 2003-526831), for example. The detection method is commonly referred to as a mutual capacitance detection method.

In both of the above-mentioned self-capacitance detection method and mutual capacitance detection method, a method for specifying, when an indicator such as a finger touches a planar area (detection cells) partitioned by row wiring and column wiring in a lattice pattern, coordinates of a position of the touch based on a balance between a detection value at a touched detection cell (sensor block) and a detection value at a detection cell near the sensor block has been proposed.

In recent years, low-resistance metal has been used to form mesh-like detection wiring, and, by making use of the characteristics of having lower resistance than a transparent electrode made of indium tin oxide (ITO) or the like, lead wires connected to respective terminals of row wires and column wires have been connected to only one side of ends of the row-direction wires and the column-direction wires (e.g., Japanese Patent Application Laid-Open Publication No. 2010-61502).

In a case where a touch screen is mounted on a display panel of a display apparatus, a display area of the display panel is covered with row-direction wiring and column-direction wiring included in the touch screen. Display-light transmittance and external-light reflectance are not uniform depending on the layout of the wiring, resulting in problems of a moiré effect and clear visibility of the wiring. To solve the problems, a less-noticeable touch screen, for example, a touch screen whose wiring is less likely to be viewed by a user, has been proposed to provide users with images of high quality (e.g., WO 2014/050306 and Japanese Patent Application Laid-Open Publication No. 2014-109997).

As described above, in a touch screen as disclosed in WO 2014/050306 and Japanese Patent Application Laid-Open Publication No. 2014-109997, for example, at disconnected portions (electrically-separated portions) of row-direction wiring from the other wiring in the same layer and at disconnected portions of column-direction wiring from the other wiring in the same layer, dummy wiring is disposed in a different layer from the disconnected portions. By disposing such dummy wiring, the disconnected portions can have the same planar shape as the other portions, and thus visibility of the disconnected portions can be suppressed.

It is, however, difficult to superimpose the dummy wiring onto the disconnected portions in a plan view with high accuracy, and misalignment of the dummy wiring is likely to occur. As a result, the superimposed portions have a different planar shape from the other portions, and this non-uniform planar shape causes a problem in that the superimposed portions are visible.

SUMMARY OF THE INVENTION

The present invention has been conceived in view of problems as described above, and aims to provide technology enabling an increase in display quality.

The present invention is a touch screen, and includes a substrate and a mesh-like lower electrode and a mesh-like upper electrode that are disposed, on the substrate, with an insulating film therebetween. The lower electrode and the upper electrode have crossing portions where first element wiring of a mesh of the lower electrode and second element wiring of a mesh of the upper electrode cross each other in three dimensions. The lower electrode includes mesh-like first detection wiring that is one of row-direction wiring and column-direction wiring, and mesh-like first insulating wiring that is insulated from the first detection wiring by first disconnected portions provided to the first element wiring other than the crossing portions. The upper electrode includes mesh-like second detection wiring that is the other one of the row-direction wiring and the column-direction wiring, and mesh-like second insulating wiring that is insulated from the second detection wiring by second disconnected portions provided to the second element wiring other than the crossing portions.

Since visibility of the disconnected portions can be suppressed, display quality can be increased.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an enlarged plan view illustrating the structure of the lower electrode according to Embodiment 1;

FIG. 5 is a plan view illustrating the structure of an upper electrode according to Embodiment 1;

FIG. 6 is an enlarged plan view illustrating the structure of the upper electrode according to Embodiment 1;

FIG. 8 is a plan view illustrating the structure of first element wiring and second element wiring according to Embodiment 2;

FIG. 9 is a plan view illustrating the structure of first element wiring and second element wiring according to Embodiment 3;

FIG. 10 is a plan view illustrating the structure of a lower electrode according to Embodiment 3;

FIG. 11 is an enlarged plan view illustrating the structure of the lower electrode according to Embodiment 3;

FIG. 13 is an enlarged plan view illustrating the structure of the upper electrode according to Embodiment 3.

DESCRIPTION OF THE PREFERRED EMBODIMENTS

Embodiment 1

Figure 1:
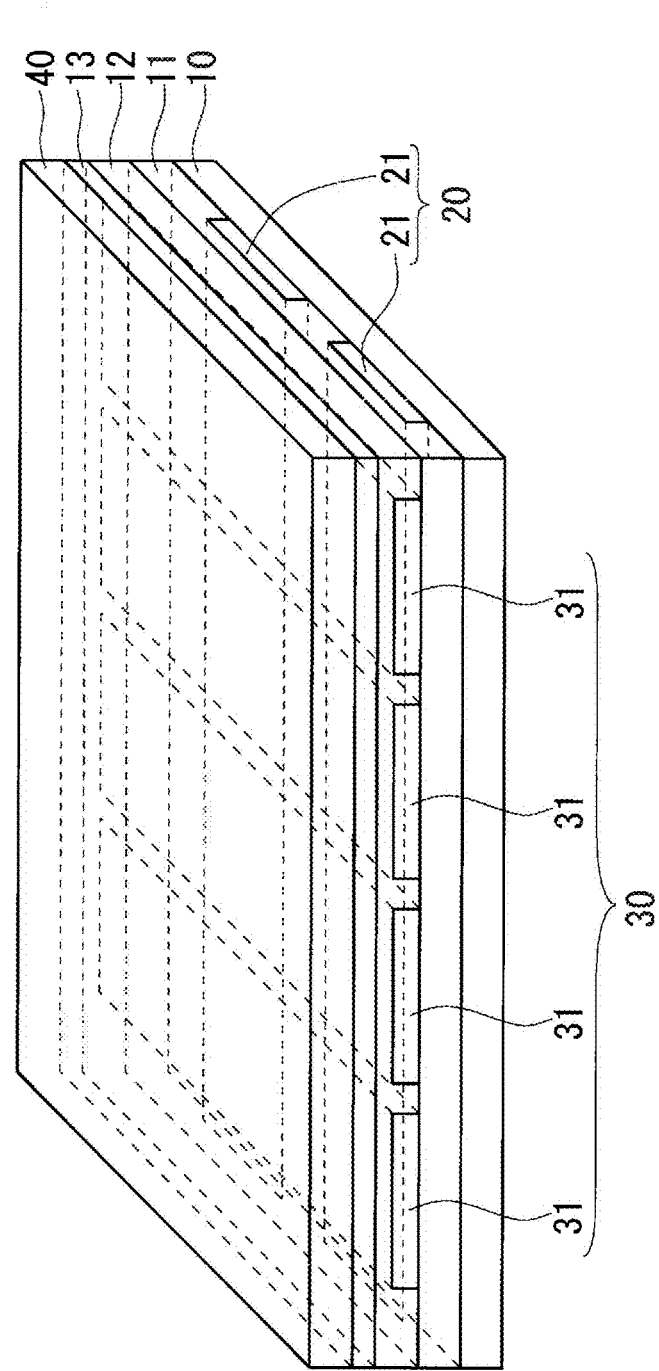
FIG. 1 is a perspective view illustrating the structure of a touch screen according to Embodiment 1.
Figure 2:
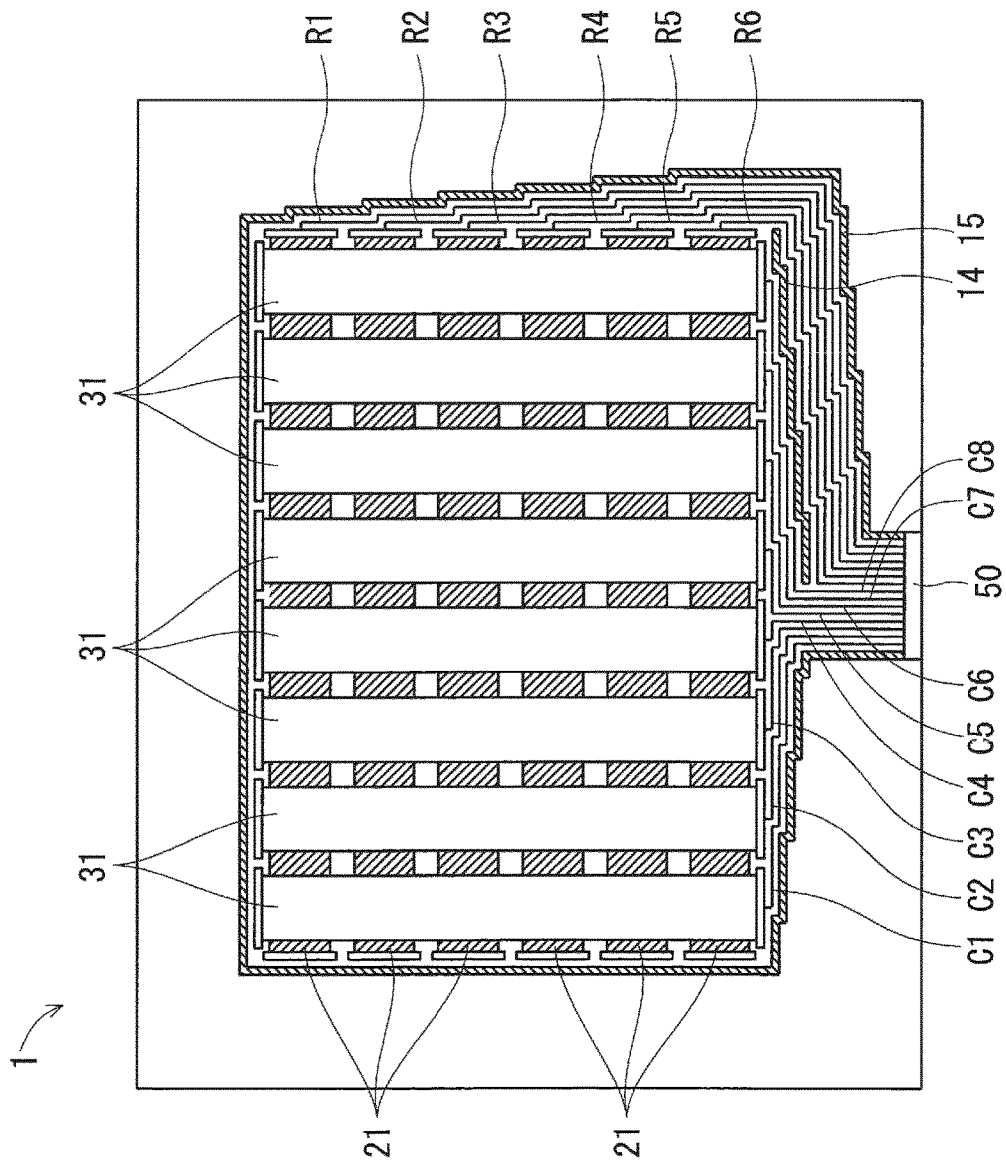
FIG. 2 is a plan view illustrating the structure of the touch screen according to Embodiment 1.

FIG. 1 is a perspective view illustrating the structure of a touch screen 1 according to Embodiment 1 of the present invention, and FIG. 2 is a plan view illustrating the structure of the touch screen 1. A layer structure of the touch screen 1 according to Embodiment 1 is described first with use of FIGS. 1 and 2. The touch screen 1 according to Embodiment 1 is a projected capacitive touch screen.

As illustrated in FIG. 1, the touch screen 1 includes a transparent substrate 10, which is a substrate, a lower electrode 20, an interlayer insulating film 11, an upper electrode 30, a protective film 12, an adhesive 13, and a transparent substrate 40.

The transparent substrate 10 is used as a lower surface layer of the touch screen 1, and is a substrate made of a transparent glass material or a transparent resin, for example.

The lower electrode 20 is disposed on the transparent substrate 10, and is a mesh-like electrode, although this is not illustrated in FIGS. 1 and 2 for convenience' sake. The lower electrode 20 is made of a transparent wiring material such as indium tin oxide (ITO) or a metal wiring material such as aluminum, for example.

Although the lower electrode 20 is illustrated in FIGS. 1 and 2 to include only a plurality of rows of row-direction wiring 21 (first detection wiring) for convenience' sake, the lower electrode 20 includes wiring (electrodes) other than the row-direction wiring 21 as described later. Although the row-direction wiring 21 is illustrated in FIGS. 1 and 2 as rod-like wiring, the row-direction wiring 21 is mesh-like wiring.

The interlayer insulating film 11, which is an insulating film, is disposed on the transparent substrate 10 to cover the lower electrode 20. The interlayer insulating film 11 is a transparent (light-transmissive) insulating film such as a silicon nitride film and a silicon oxide film, for example. The interlayer insulating film 11 insulates the lower electrode 20 and the upper electrode 30 from each other.

The upper electrode 30 is disposed on the interlayer insulating film 11, and is a mesh-like electrode, although this is not illustrated in FIGS. 1 and 2 for convenience' sake. The upper electrode 30 is made of a transparent wiring material such as ITO or a metal wiring material such as aluminum, for example.

Although the upper electrode 30 is illustrated in FIGS. 1 and 2 to include only a plurality of columns of column-direction wiring 31 (second detection wiring) for convenience' sake, the upper electrode 30 includes wiring (electrodes) other than the column-direction wiring 31 as described later. Although the column-direction wiring 31 is illustrated in FIGS. 1 and 2 as rod-like wiring, the column-direction wiring 31 is mesh-like wiring. As described above, the lower electrode 20 and the upper electrode 30 are disposed with the interlayer insulating film 11 therebetween in Embodiment 1.

The protective film 12 is disposed on the interlayer insulating film 11 to cover the upper electrode 30. As with the interlayer insulating film 11, the protective film 12 is a transparent (light-transmissive) insulating film such as a silicon nitride film, for example.

The transparent substrate 40 made of a transparent glass material or a transparent resin is disposed on the protective film 12 for protection of the touch screen 1. The transparent substrate 40 is stuck to the protective film 12 by using the adhesive 13, such as an optical clear adhesive (OCA) and a double-sided tape, for example.

In Embodiment 1, the above-mentioned column-direction wiring 31 and row-direction wiring 21 each have a multi-layer structure including an aluminum-based alloy layer and a nitrided layer which is a nitrided aluminum-based alloy layer. Such a structure can reduce wiring resistance as well as light reflectance in a detectable area. The detectable area herein refers to an area, of the touch screen 1, in which a touch of an indicator such as a finger can be detected.

In Embodiment 1, the first detection wiring of the lower electrode 20 is the row-direction wiring 21, and the second detection wiring of the upper electrode 30 is the column-direction wiring 31, i.e., the column-direction wiring 31 is disposed in a layer above the row-direction wiring 21, but the structure is not limited to this structure. For example, the positional relationship may be reversed so that the first detection wiring of the lower electrode 20 is the column-direction wiring 31, and the second detection wiring of the upper electrode 30 is the row-direction wiring 21, i.e., the row-direction wiring 21 is disposed in a layer above the column-direction wiring 31. Alternatively, the row-direction wiring 21 and the column-direction wiring 31 may be disposed in the same layer, and the interlayer insulating film (insulating film) 11 may be disposed only in portions where the row-direction wiring 21 and the column-direction wiring 31 overlap each other in a plan view to electrically separate the row-direction wiring 21 and the column-direction wiring 31 from each other.

In Embodiment 1, the row-direction wiring 21 and the column-direction wiring 31 each have the multi-layer structure including the aluminum-based alloy layer and the nitrided layer which is the nitrided aluminum-based alloy layer as described above, but the structure is not limited to this structure. Various combinations may be applied, for example, by forming the column-direction wiring 31 to have the above-mentioned multi-layer structure, and forming the row-direction wiring 21 using a transparent wiring material such as ITO.

A user touches the transparent substrate 40, which is a surface of the touch screen 1 having the structure as illustrated in FIGS. 1 and 2, using an indicator such as a finger to perform operation. When the indicator comes into contact with (touches) the transparent substrate 40, capacitive coupling (touch capacitance) occurs between the indicator and the row-direction wiring 21 or the column-direction wiring 31. In a case where the touch screen 1 is a mutual capacitive touch screen, for example, a position of the touch in the detectable area can be specified by detecting a change in mutual capacitance caused between the upper electrode 30 and the lower electrode 20 (i.e., between the column-direction wiring 31 and the row-direction wiring 21) due to occurrence of the touch capacitance. In a case where the touch screen 1 is a self-capacitive touch screen, for example, the position of the touch in the detectable area can be specified by detecting a change in capacitance caused between the indicator and the upper electrode 30 and the lower electrode 20.

The above-mentioned detectable area of the touch screen 1 in FIG. 2 corresponds to a matrix area composed of a plurality of rows of the row-direction wiring 21 extending in a row direction (horizontal direction of the plane of FIG. 2) and a plurality of columns of the column-direction wiring 31 extending in a column direction (vertical direction of the plane of FIG. 2) in a position further forward than the row-direction wiring 21.

Respective rows of the row-direction wiring 21 are connected, through lead wires R1 to R6, to a terminal 50 for electrically connecting to external wiring. Respective columns of the column-direction wiring 31 are connected to the terminal 50 through lead wires C1 to C8. A dummy lead wire 14 is disposed between the lead wire R6 and the lead wire C8.

The lead wires R1 to R6 and the lead wires C1 to C8 are disposed close to one another in the periphery of the detectable area. In this case, as for the lead wires R1 to R6, the lead wire R6, which is the shortest one of the lead wires R1 to R6, is disposed so as to be an innermost lead wire, and the other lead wires R1 to R5 are disposed along the lead wire R6. As for the lead wires C1 to C8, based on the lead wire C4, which is the shortest one of the lead wires C1 to C8, the other lead wires C1 to C3 and C5 to C8 are disposed along the lead wire C4.

By disposing the lead wires R1 to R6 and the lead wires C1 to C8 close to one another in the periphery of the detectable area as described above, fringe capacitance occurring between a display panel of a display apparatus on which the touch screen 1 is mounted and lead wires (the lead wires R2 to R6 and the lead wires C2 to C8) other than the lead wire R1 and the lead wire C1, which are outermost lead wires, can be suppressed.

A shield wire 15 into which ground potential is input is disposed around the lead wire R1 and the lead wire C1. This means that the shield wire 15 is disposed to surround the row-direction wiring 21, the column-direction wiring 31, and the lead wires R1 to R6 and C1 to C8 in a plan view. By disposing the shield wire 15, fringe capacitance occurring between the display panel of the display apparatus on which the touch screen 1 is mounted and the lead wire R1 and the lead wire C1 can be suppressed.

By disposing the lead wires R1 to R6 and the lead wires C1 to C8 as described above, influences of electromagnetic noise generated from the display panel on which the touch screen 1 is mounted on the lead wires can be reduced.

Figure 3:
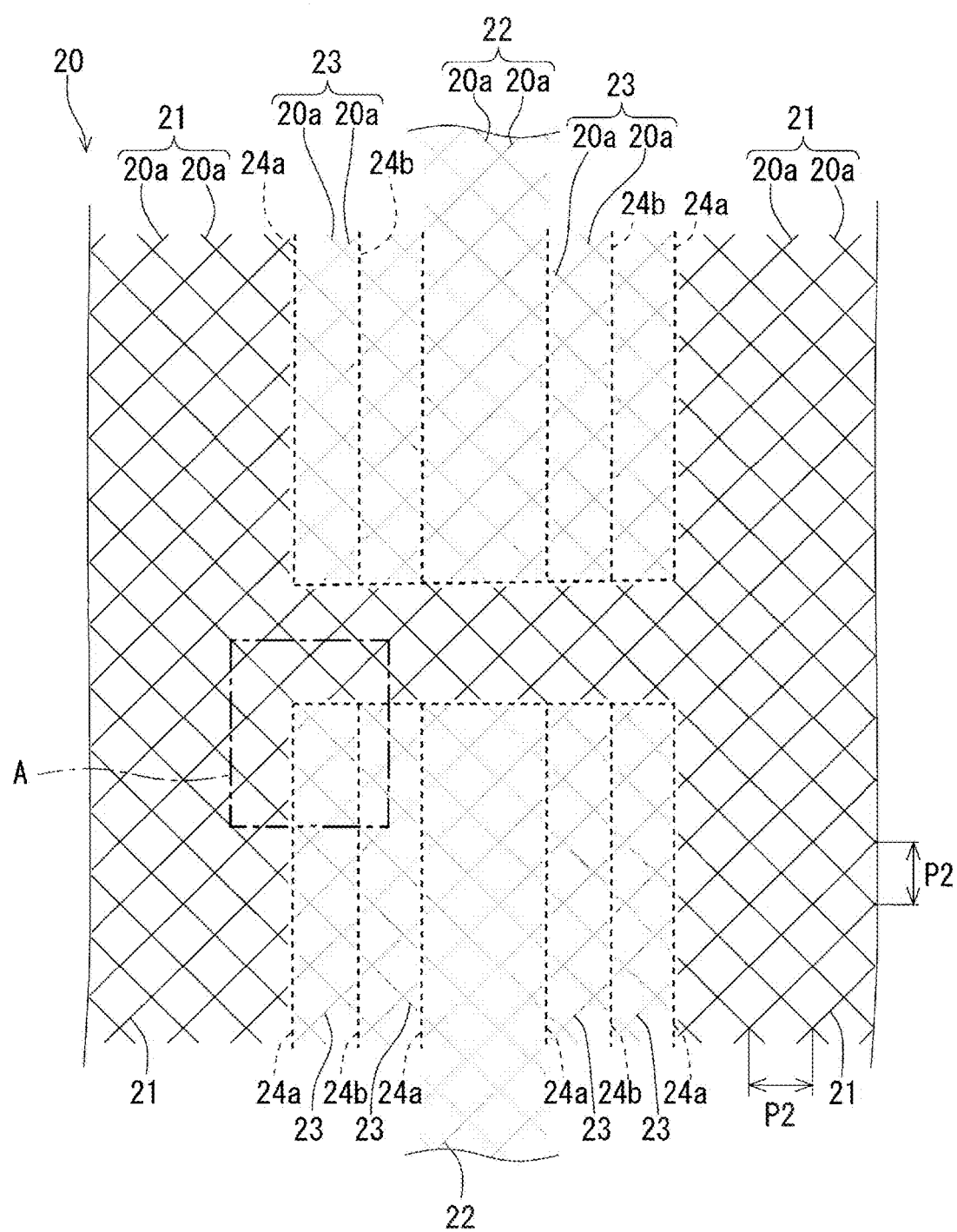
FIG. 3 is a plan view illustrating the structure of a lower electrode according to Embodiment 1.
Figure 7:
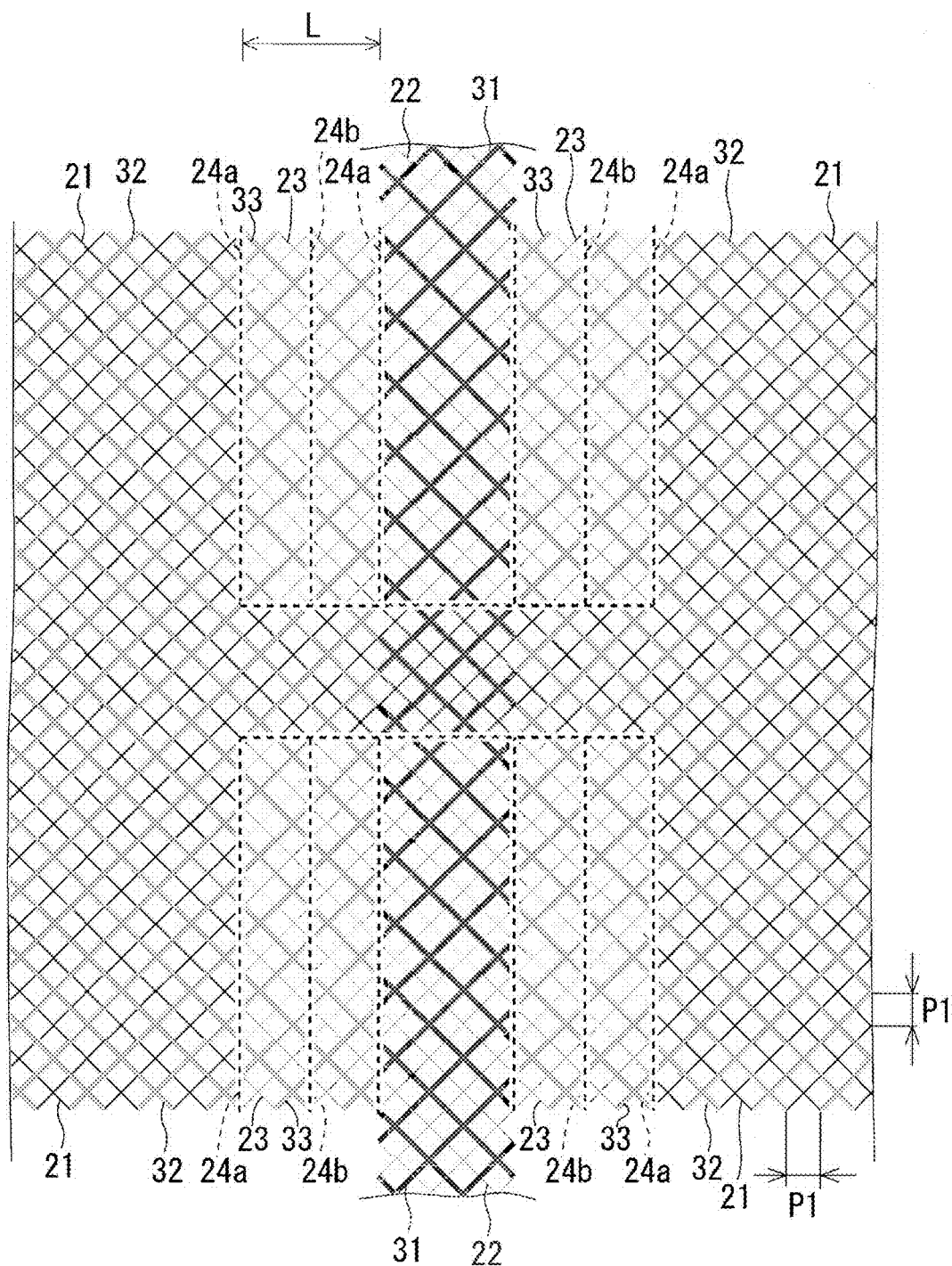
FIG. 7 is a plan view illustrating the structure of the lower electrode and the upper electrode according to Embodiment 1.

FIG. 3 is a plan view of the lower electrode 20, and is an enlarged plan view of an area where the row-direction wiring 21 and the column-direction wiring 31 overlap each other in a plan view and a peripheral area thereof. FIG. 4 is an enlarged view of an area A of FIG. 3, and shows the lower electrode 20 in solid lines and shows the upper electrode 30 in broken lines. FIG. 5 is a plan view of the upper electrode 30, and is an enlarged plan view of an area where the row-direction wiring 21 and the column-direction wiring 31 overlap each other in a plan view and a peripheral area thereof. FIG. 6 is an enlarged view of an area B of FIG. 5, and shows the upper electrode 30 in solid lines and shows the lower electrode 20 in broken lines. FIG. 7 is a plan view illustrating the lower electrode 20 of FIG. 3 and the upper electrode 30 of FIG. 5 overlapping each other.

Assume that a horizontal direction is the row direction, and a vertical direction is the column direction in FIGS. 3 to 7. FIGS. 3 to 7 schematically illustrate wiring patterns, and the width of each wire and the interval between wires are not limited to those illustrated in FIGS. 3 to 7. For simplicity, reference signs of disconnected portions 34a and 34b and the like are omitted in FIG. 7.

The following describes the structure of the lower electrode 20 and the upper electrode 30 and hence the row-direction wiring 21 and the column-direction wiring 31 in detail with use of FIGS. 3 to 7.

As illustrated in FIG. 3, the mesh-like lower electrode 20 includes the mesh-like row-direction wiring 21 extending in the row direction (horizontal direction) and mesh-like first insulating wiring (mesh-like column-direction dummy wiring 22 and mesh-like floating electrodes 23).

The mesh-like lower electrode 20 includes, as a mesh thereof, first element wiring 20a composed of linear conductive wires extending in a direction of 45° from the row direction and linear conductive wires extending in a direction of −45° from the row direction. The linear conductive wires of the first element wiring 20a are repeatedly arranged at predetermined intervals.

As illustrated in FIG. 5, the mesh-like upper electrode 30 includes the mesh-like column-direction wiring 31 extending in the column direction (vertical direction) and mesh-like second insulating wiring (mesh-like row-direction dummy wiring 32 and mesh-like floating electrodes 33).

The mesh-like upper electrode 30 includes, as a mesh thereof, second element wiring 30a composed of linear conductive wires extending in a direction of 45° from the row direction and linear conductive wires extending in a direction of −45° from to the row direction. The linear conductive wires of the second element wiring 30a are repeatedly arranged at predetermined intervals.

As illustrated in FIG. 7, the mesh-like lower electrode 20 and the mesh-like upper electrode 30 complementarily overlap each other so that the mesh of the lower electrode 20 and the mesh of the upper electrode 30 are offset from each other. As a result, the lower electrode 20 and the upper electrode 30 have crossing portions where the first element wiring 20a and the second element wiring 30a cross each other in three dimensions.

For example, the first element wiring 20a of the row-direction wiring 21 and the second element wiring 30a of the column-direction wiring 31 in the layer above the first element wiring 20a of the row-direction wiring 21 cross each other in three dimensions. For example, the first element wiring 20a of the row-direction wiring 21 and the second element wiring 30a of the row-direction dummy wiring 32 in the layer above the first element wiring 20a of the row-direction wiring 21 cross each other in three dimensions. For example, the first element wiring 20a of the column-direction dummy wiring 22 and the second element wiring 30a of the column-direction wiring 31 in the layer above the first element wiring 20a of the column-direction dummy wiring 22 cross each other in three dimensions.

For example, the first element wiring 20a of the floating electrodes 23 of FIG. 3 and the second element wiring 30a of the floating electrodes 33 of FIG. 5 cross each other in three dimensions. The floating electrodes 23 of FIG. 3 do not substantially cross the column-direction wiring 31 of FIG. 5 in three dimensions, and the floating electrodes 33 of FIG. 5 do not substantially cross the row-direction wiring 21 of in FIG. 3 in three dimensions.

According to structure as described above, a difference in external-light reflectance between the lower electrode 20 and the upper electrode 30 can be reduced, and thus the reflectance can be made uniform in the entire detectable area.

As illustrated in FIGS. 3 and 4, the row-direction wiring 21 and the first insulating wiring (column-direction dummy wiring 22 and floating electrodes 23) are insulated from each other by disconnected portions 24a, which are first disconnected portions, provided to the first element wiring 20a other than the crossing portions. The column-direction dummy wiring 22 and the floating electrodes 23 are insulated from each other by disconnected portions 24a provided to the first element wiring 20a other than the crossing portions. The floating electrodes 23 are insulated from each other by disconnected portions 24b provided in a line in the column direction to the first element wiring 20a other than the crossing portions. The disconnected portions 24a and 24b are parts of the interlayer insulating film 11 electrically separated from each other, for example.

As illustrated in FIGS. 5 and 6, the column-direction wiring 31 and the second insulating wiring (row-direction dummy wiring 32 and floating electrodes 33) are insulated from each other by disconnected portions 34a, which are second disconnected portions, provided to the second element wiring 30a other than the crossing portions. The row-direction dummy wiring 32 and the floating electrodes 33 are insulated from each other by disconnected portions 34a provided to the second element wiring 30a other than the crossing portions. The floating electrodes 33 are insulated from each other by disconnected portions 34b provided in a line in the column direction to the second element wiring 30a other than the crossing portions. The disconnected portions 34a and 34b are parts of the interlayer insulating film 11 electrically separated from each other, for example.

In Embodiment 1, the disconnected portions 24a and 24b and the disconnected portions 34a and 34b are located close to each other as illustrated in FIGS. 4 and 6.

In a conventional structure as disclosed in WO 2014/050306 and Japanese Patent Application Laid-Open Publication No. 2014-109997, disconnected portions are provided in crossing portions, and dummy wiring is disposed in the disconnected portions. In such a conventional structure, the dummy wiring might be misaligned in a superimposition process during manufacture, and thus the disconnected portions have a different planar shape from the other portions, causing a problem in that the disconnected portions are visible. In the conventional structure in which the disconnected portions are provided in the crossing portions, dielectric breakdown might be caused by foreign matter introduced during manufacture and an external factor (static electricity).

In contrast, in Embodiment 1, the disconnected portions 24a, 24b, 34a, and 34b are provided to the first element wiring 20a and the second element wiring 30a other than the crossing portions. Such a structure eliminates the need to dispose the dummy wiring in the disconnected portions, and thus visibility of the disconnected portions can be suppressed in a case where the touch screen 1 is mounted at the front side of the display apparatus. As a result, display quality can be increased. Furthermore, in Embodiment 1, since the disconnected portions 24a, 24b, 34a, and 34b are provided to the first element wiring 20a and the second element wiring 30a other than the crossing portions, occurrence of the above-mentioned electrical problems and hence occurrence of false detection can be suppressed even if a short circuit occurs in the crossing portions.

In Embodiment 1, the conductive wires of the first element wiring 20a and the conductive wires of the second element wiring 30a each have a width of 3 μm, and the disconnected portions 24a, 24b, 34a, and 34b each have a size (the distance between conductive wires opposing each other with a disconnected portion therebetween) of 3 μm. The transparent substrate 10 has a thickness of 0.9 mm, and the floating electrodes 23 have a width (width L in FIG. 7) in the row direction of 800 μm. A mesh interval P2 shown in FIG. 3 and a mesh interval P3 shown in FIG. 5 are each 400 μm, and a mesh interval P1 shown in FIG. 7 is 200 μm.

By using mesh-like wiring as the row-direction wiring 21 and the column-direction wiring 31 as in Embodiment 1, a wider area like the detectable area can be covered with a smaller wiring area. Parasitic capacitance of wiring can be reduced, and a moiré effect can be suppressed also by using mesh-like wiring as the row-direction wiring 21 and the column-direction wiring 31.

Materials for the row-direction wiring 21 and the column-direction wiring 31, a conductive wire width (the width of each of the conductive wires of the first element wiring 20a and the second element wiring 30a), mesh intervals, and sizes of the disconnected portions 24a, 24b, 34a, and 34b are not limited to those described above.

For example, the row-direction wiring 21 and the column-direction wiring 31 may be made of a transparent conductive material such as ITO and graphene or a metal material such as aluminum, chromium, copper, and silver. The row-direction wiring 21 and the column-direction wiring 31 may be made of an alloy of aluminum, chromium, copper, silver, and the like, or may have a multi-layer structure in which an aluminum nitride and the like have been formed on the alloy. The conductive wire width, the mesh intervals, and the sizes of the disconnected portions 24a, 24b, 34a, and 34b may have different values from those described above depending on the application and the like of the touch screen 1.

In Embodiment 1, the disconnected portions 34b are arranged in a line in the column direction. The arrangement is not limited to this arrangement, and the disconnected portions 34b may be arranged in a plurality of lines.

In Embodiment 1, the lower electrode 20 and the upper electrode 30 each include a floating electrode. According to such a structure, a portion (portion not crossing the column-direction wiring 31) of the row-direction wire 21 having a larger overall width and the column-direction wiring 31 can be separated from each other.

Conclusion of Embodiment 1

In the touch screen 1 according to Embodiment 1, the mesh-like lower electrode 20 in one surface and the mesh-like upper electrode 30 in one surface complementarily overlap each other so that the mesh of the lower electrode 20 and the mesh of the upper electrode 30 are offset from each other. As a result, the difference in external-light reflectance between the lower electrode 20 (row-direction wiring 21) and the upper electrode 30 (column-direction wiring 31) can be reduced, and thus the reflectance can be made uniform in the entire detectable area. Furthermore, since the disconnected portions are provided to the first element wiring 20a and the second element wiring 30a other than the crossing portions, the disconnected portions are less likely to be visible, and the occurrence of the electrical problems can be suppressed.

The touch screen 1 according to Embodiment 1 includes wiring patterns in two vertically-arranged layers of the row-direction wiring 21 and the column-direction wiring 31, and an overall width of the row-direction wiring 21 or an overall width of the column-direction wiring 31 are reduced in a range where the mesh-like row-direction wiring 21 as a whole and the mesh-like column-direction wiring 31 as a whole cross each other. The floating electrodes 23 and 33, which are insulated from surrounding wiring, are provided between the portion of the row-direction wiring 21 having a larger overall width and the column-direction wiring 31.

According to such a structure, the floating electrodes 23 and 33 can separate the portion of the row-direction wiring 21 having a larger overall width and the column-direction wiring 31 from each other by the width (width L in FIG. 7) of the floating electrodes 23 and 33 in the row direction. The floating electrodes 23 and 33 can thus reduce cross capacitance occurring between the row-direction wiring 21 and the column-direction wiring 31. The amount of change in cross capacitance occurring when the transparent substrate 10 is touched can be increased. As a result, sensitivity of detection of a touch can be increased compared to a case where no floating electrodes are provided. Furthermore, since external-light reflectance is made uniform, visibility of the row-direction wiring 21 and the column-direction wiring 31 can be suppressed.

To confirm the effects, the touch screen 1 according to Embodiment 1 and a touch screen with no floating electrodes were actually compared with each other in terms of detection of a touch of a finger by mounting a mutual capacitive detection circuit on each of the touch screens. As a result, in the touch screen with no floating electrodes, coordinates of a position of a touch were not correctly detected as cross capacitance was large, and exceeded a dynamic range of the detection circuit. In contrast, in the touch screen 1 according to Embodiment 1, coordinates of a position of a touch were correctly detected.

To check visibility, the touch screen 1 according to Embodiment 1 was viewed under direct sunlight having an illuminance of 80000 [lux], and, as a result, the lower electrode 20, the upper electrode 30, and the disconnected portions 24a, 24b, 34a, and 34b were not visible.

In the touch screen 1 according to Embodiment 1, the disconnected portions 24a and 24b and the disconnected portions 34a and 34b have the same size, and are located close to each other. According to such a structure, spatial frequency is uniform, leading to improvement in appearance.

Embodiment 2

The touch screen 1 according to Embodiment 2 of the present invention is similar to that in Embodiment 1 except for the first element wiring 20a and the second element wiring 30a. Components of the touch screen 1 according to Embodiment 2 that are the same as or similar to those described above bear the same reference signs, and description is made mainly on the differences from those described above.

FIG. 8 is a plan view illustrating the structure of the first element wiring 20a and the second element wiring 30a according to Embodiment 2. The first element wiring 20a shown in FIG. 8 is applied to the first element wiring of the lower electrode 20 (row-direction wiring 21, column-direction dummy wiring 22, and floating electrodes 23), and the second element wiring 30a shown in FIG. 8 is applied to the second element wiring of the upper electrode 30 (column-direction wiring 31, row-direction dummy wiring 32, and floating electrodes 33).

As illustrated in FIG. 8, the second element wiring 30a has a larger width in the crossing portions than in portions other than the crossing portions.

Conclusion of Embodiment 2

The second element wiring 30a typically tends to have a slightly larger width in portions where wires of the second element wiring 30a are connected to each other than in the other portions of the second element wiring 30a due to effects of an exposure process, although this is not intended in designing.

In contrast, in Embodiment 2, the second element wiring 30a also has a larger width in the crossing portions where the first element wiring 20a and the second element wiring 30a cross each other in three dimensions. According to such a structure, a planar shape is made uniform in the portions where wires of the second element wiring 30a are connected to each other and in the portions where the first element wiring 20a and the second element wiring 30a cross each other in three dimensions, leading to an increase in visibility of a display apparatus and the like on which the touch screen 1 is mounted.

In the structure described above, the second element wiring 30a has a larger width in the crossing portions than in the portions other than the crossing portions. The structure in Embodiment 2, however, is not limited to this structure, and the first element wiring 20a may have a larger width in the crossing portions than in the portions other than the crossing portions. These structures may be combined with each other, that is, the first element wiring 20a may have a larger width in the crossing portions than in the portions other than the crossing portions, and the second element wiring 30a may have a larger width in the crossing portions than in the portions other than the crossing portions.

Embodiment 3

The touch screen 1 according to Embodiment 3 of the present invention is similar to that in Embodiment 1 except for the first element wiring 20a and the second element wiring 30a. Components of the touch screen 1 according to Embodiment 3 that are the same as or similar to those described above bear the same reference signs, and description is made mainly on the differences from those described above.

FIG. 9 is a plan view illustrating the structure of the first element wiring 20a and the second element wiring 30a according to Embodiment 3. The first element wiring 20a shown in FIG. 9 is applied to the first element wiring of the lower electrode 20 (row-direction wiring 21, column-direction dummy wiring 22, and floating electrodes 23), and the second element wiring 30a shown in FIG. 9 is applied to the second element wiring of the upper electrode 30 (column-direction wiring 31, row-direction dummy wiring 32, and floating electrodes 33).

As illustrated in FIG. 9, in Embodiment 3, conductive wires of the first element wiring 20a and the second element wiring 30a are not linear but are curved so that a unit pattern of the conductive wires is arcuate. The unit pattern of the conductive wires according to Embodiment 3 includes S-shaped conductive wires crossing each other. The radius of each of arcs constituting an S-shaped conductive wire is r. Although an interval P4 between unit patterns in the row direction and an interval P5 between unit patterns in the column direction are each set to 200 µm herein, and the radius r of each of the arcs is herein set to 100 µm, the intervals P4 and P5 and the radius r are not limited to these examples.

Figure 12:
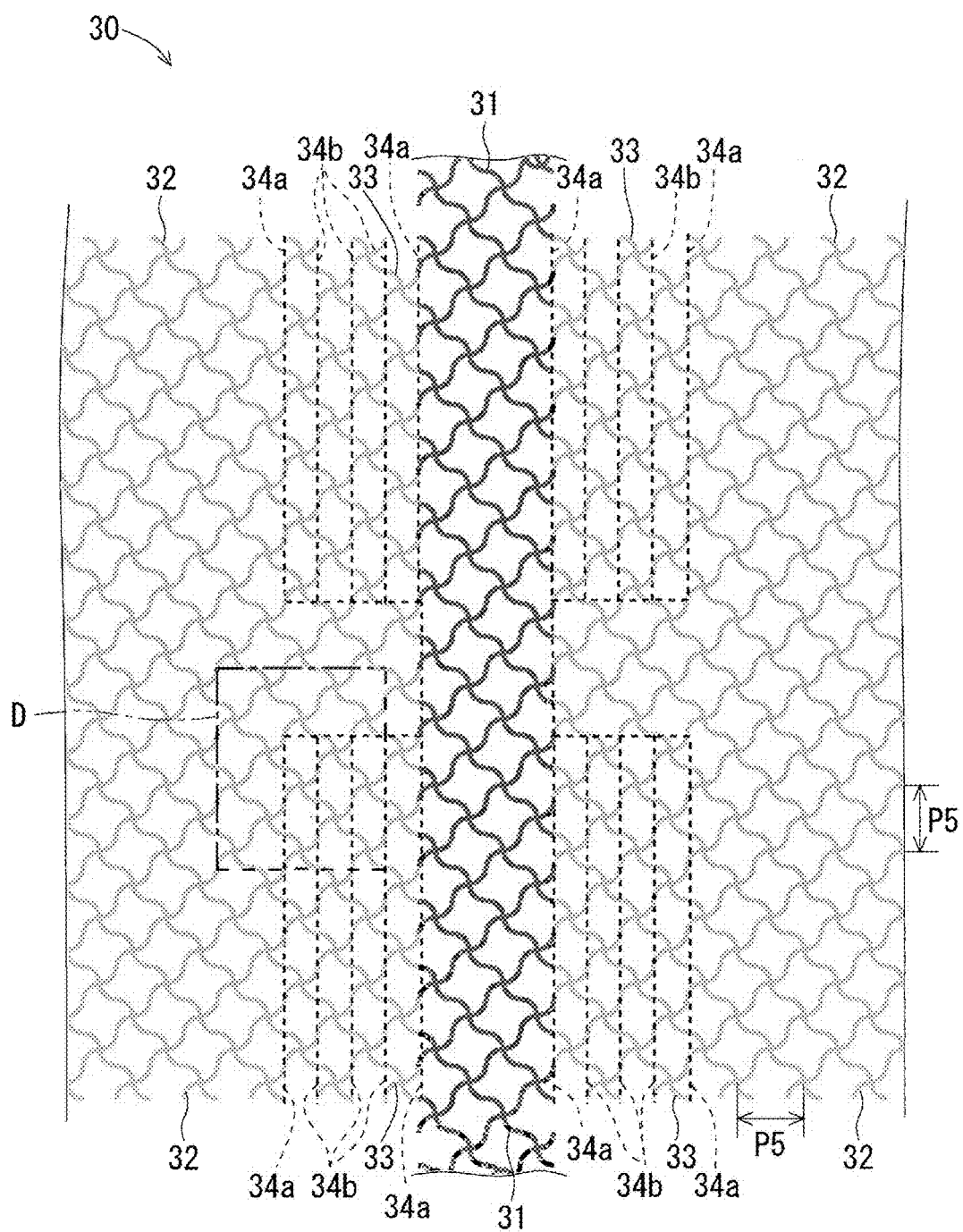
FIG. 12 is a plan view illustrating the structure of an upper electrode according to Embodiment 3.
Figure 14:
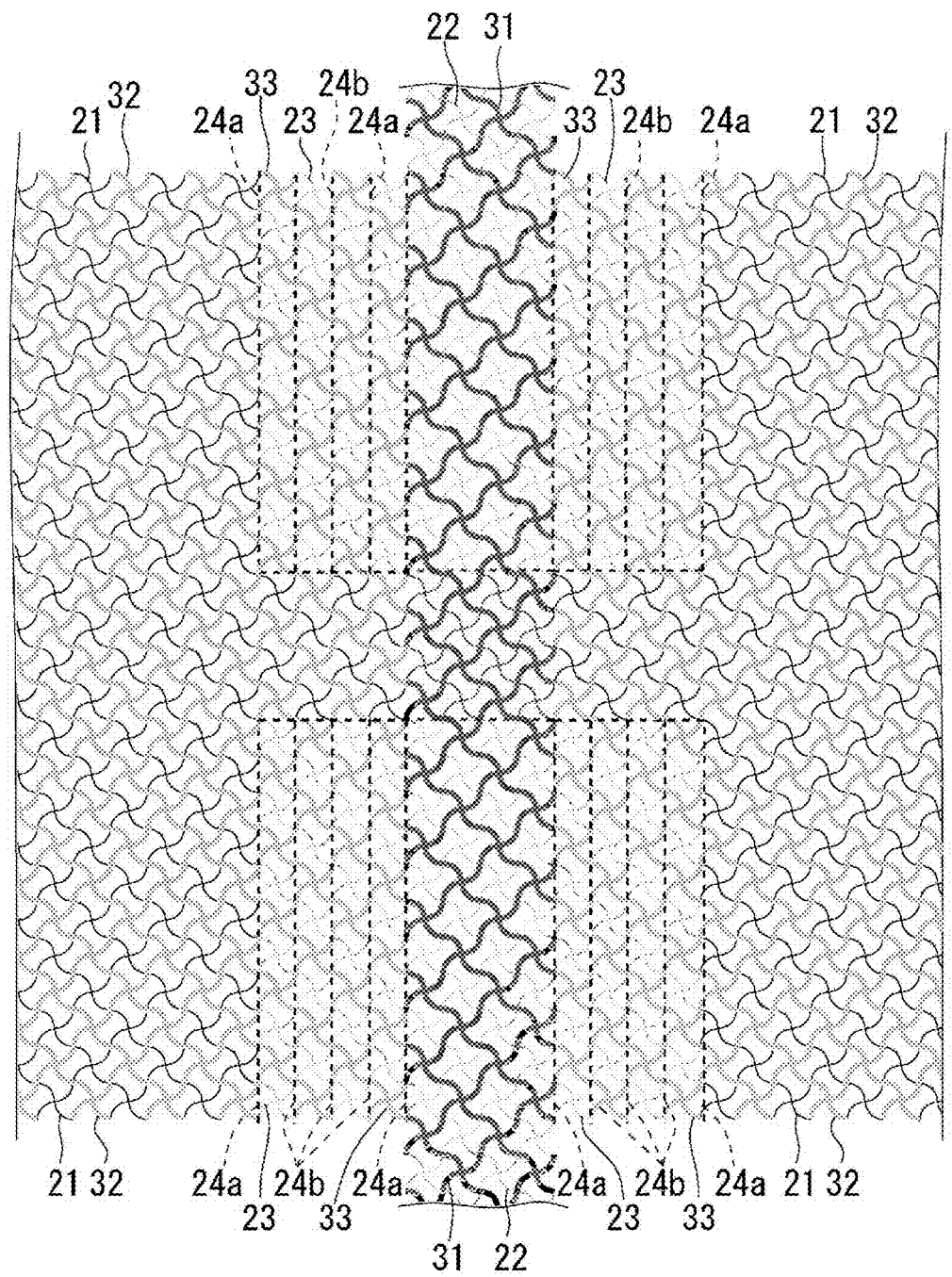
FIG. 14 is a plan view illustrating the structure of the lower electrode and the upper electrode according to Embodiment 3.

FIG. 10 is a plan view of the lower electrode 20, and is an enlarged plan view of an area where the row-direction wiring 21 and the column-direction wiring 31 overlap each other in a plan view and a peripheral area thereof. FIG. 11 is an enlarged view of an area C of FIG. 10, and shows the lower electrode 20 in solid lines and shows the upper electrode 30 in broken lines. FIG. 12 is a plan view of the upper electrode 30, and is an enlarged plan view of an area where the row-direction wiring 21 and the column-direction wiring 31 overlap each other in a plan view and a peripheral area thereof. FIG. 13 is an enlarged view of an area D of FIG. 12, and shows the upper electrode 30 in solid lines and shows the lower electrode 20 in broken lines. FIG. 14 is a plan view illustrating the lower electrode 20 of FIG. 10 and the upper electrode 30 of FIG. 12 overlapping each other.

Assume that a horizontal direction is the row direction, and a vertical direction is the column direction in FIGS. 10 to 14. FIGS. 10 to 14 schematically illustrate wiring patterns, and the width of each wire and the interval between wires are not limited to those illustrated in FIGS. 10 to 14. For simplicity, reference signs of the disconnected portions 34a and 34b and the like are omitted in FIG. 14.

The following describes the structure of the lower electrode 20 and the upper electrode 30 and hence the row-direction wiring 21 and the column-direction wiring 31 in detail with use of FIGS. 10 to 14.

The lower electrode 20 of FIG. 10 is obtained by replacing a unit pattern of wires of the lower electrode 20 of FIG. 3 with the arcuate unit pattern shown in FIG. 9. As illustrated in FIG. 10, the mesh-like lower electrode 20 includes the mesh-like row-direction wiring 21 extending in the row direction (horizontal direction) and the mesh-like first insulating wiring (mesh-like column-direction dummy wiring 22 and mesh-like floating electrodes 23).

As illustrated in FIGS. 10 and 11, the row-direction wiring 21 and the first insulating wiring (column-direction dummy wiring 22 and floating electrodes 23) are insulated from each other by disconnected portions 24a, which are first disconnected portions, provided to the first element wiring 20a other than the crossing portions. The column-direction dummy wiring 22 and the floating electrodes 23 are insulated from each other by disconnected portions 24a provided to the first element wiring 20a other than the crossing portions. The floating electrodes 23 are insulated from each other by disconnected portions 24b provided in three lines in the column direction to the first element wiring 20a other than the crossing portions.

The upper electrode 30 of FIG. 12 is obtained by replacing a unit pattern of wires of the upper electrode 30 of FIG. 5 with the arcuate unit pattern shown in FIG. 9. As illustrated in FIG. 12, the mesh-like upper electrode 30 includes the mesh-like column-direction wiring 31 extending in the column direction (vertical direction) and the mesh-like second insulating wiring (mesh-like row-direction dummy wiring 32 and mesh-like floating electrodes 33).

As illustrated in FIGS. 12 and 13, the column-direction wiring 31 and the second insulating wiring (row-direction dummy wiring 32 and floating electrodes 33) are insulated from each other by disconnected portions 34a, which are second disconnected portions, provided to the second element wiring 30a other than the crossing portions. The row-direction dummy wiring 32 and the floating electrodes 33 are insulated from each other by disconnected portions 34a provided to the second element wiring 30a other than the crossing portions. The floating electrodes 33 are insulated from each other by disconnected portions 34b provided in three lines in the column direction to the second element wiring 30a other than the crossing portions.

In Embodiment 3, the first element wiring 20a of the row-direction wiring 21 and the second element wiring 30a of the column-direction wiring 31 each have a width of 3 µm, and the disconnected portions 24a, 24b, 34a, and 34b each have a size of 3 µm. In Embodiment 3, S-shaped wires of each unit pattern are provided to extend in a direction of 45° from the row direction and in a direction of −45° from the row direction, but may be provided to extend in the row direction and in the column direction. The conductive wire width, the mesh intervals, and the sizes of the disconnected portions 24a, 24b, 34a, and 34b may have different values from those described above depending on the application and the like of the touch screen 1.

Conclusion of Embodiment 3

In the touch screen 1 according to Embodiment 3, the mesh-like lower electrode 20 and the mesh-like upper electrode 30 each include a repetition of a unit pattern, and the unit pattern at least partially includes an arcuate conductive wire. According to such a structure, in addition to the effects described in Embodiment 1, external light can be scattered in various directions compared to a case where the unit pattern includes a linear conductive wire, and thus glare caused by reflection of external light can be suppressed.

In Embodiment 3, the above-mentioned unit pattern is entirely formed by arcuate conductive wires. According to such a structure, external light can more effectively be scattered in various directions, and thus glare caused by reflection of external light can be suppressed.

In Embodiment 3, the above-mentioned unit pattern includes S-shaped conductive wires crossing each other. According to such a structure, external light can more effectively be scattered in various directions by the arcuate conductive wires, and thus glare caused by reflection of external light can further be suppressed.

To confirm the effects, the touch screen 1 according to Embodiment 3 and the touch screen 1 according to Embodiment 1 were actually compared with each other in terms of detection of a touch of a finger by mounting a mutual capacitive detection circuit on each of the touch screens. As a result, in the touch screen 1 according to Embodiment 3, coordinates of a position of a touch were correctly detected as in the touch screen 1 according to Embodiment 1.

To check visibility, the touch screen 1 according to Embodiment 3 and the touch screen 1 according to Embodiment 1 were viewed under direct sunlight having an illuminance of 80000 [lux]. As a result, glare caused by reflection of light from the conductive wires can be reduced more in the touch screen 1 according to Embodiment 3 than in the touch screen 1 according to Embodiment 1.

Embodiments of the present invention can freely be combined with each other, and can be modified or omitted as appropriate within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A touch screen comprising:
    a substrate; and
    a mesh-like lower electrode and a mesh-like upper electrode that are disposed, on said substrate, with an insulating film therebetween, wherein
    said lower electrode and said upper electrode have
        first crossing portions where first element wiring of a mesh of said lower electrode and second element wiring of a mesh of said upper electrode cross each other in a plan view when viewed in a direction perpendicular to the substrate,
    said lower electrode includes:
        mesh-like first detection wiring that is one of row-direction wiring and column-direction wiring; and
        mesh-like first insulating wiring that is insulated from said first detection wiring by first disconnected portions provided to said first element wiring other than said first crossing portions,
    said upper electrode includes:
        mesh-like second detection wiring that is the other one of said row-direction wiring and said column-direction wiring; and
        mesh-like second insulating wiring that is insulated from said second detection wiring by second disconnected portions provided to said second element wiring other than said first crossing portions,
    each of the first disconnected portions is provided at a position between one of the first crossing portions and a second crossing portion in which portions of the first element wiring cross each other and which is adjacent to the one of the first crossing portions along the first element wiring, and
    the second element wiring is not provided to the first disconnected portions in the plan view, and the first element wiring is not provided to the second disconnected portions in the plan view.

2. The touch screen according to claim 1, wherein said first insulating wiring and said second insulating wiring each include a floating electrode.

3. The touch screen according to claim 1, wherein one of said first element wiring and said second element wiring has a larger width in said first crossing portions where the first element wiring and the second element wiring cross each other in the plan view than in portions of the one of said first element wiring and said second element wiring other than said first crossing portions.

4. The touch screen according to claim 3, wherein the other one of said first element wiring and said second element wiring has a larger width in said first crossing portions than in portions other than said first crossing portions.

5. The touch screen according to claim 1, wherein said first disconnected portions and said second disconnected portions have the same size, and are located close to each other.

6. A touch panel comprising:
    a touch screen; and
    a detection circuit that detects a touch position on said touch screen, wherein
    said touch screen includes:
        a substrate; and
        a mesh-like lower electrode and a mesh-like upper electrode that are disposed, on said substrate, with an insulating film therebetween,
    said lower electrode and said upper electrode have
        first crossing portions where first element wiring of a mesh of said lower electrode and second element wiring of a mesh of said upper electrode cross each other in a plan view when viewed in a direction perpendicular to the substrate,
    said lower electrode includes:
        mesh-like first detection wiring that is one of row-direction wiring and column-direction wiring; and
        mesh-like first insulating wiring that is insulated from said first detection wiring by first disconnected portions provided to said first element wiring other than said first crossing portions,
    said upper electrode includes:
        mesh-like second detection wiring that is the other one of said row-direction wiring and said column-direction wiring; and
        mesh-like second insulating wiring that is insulated from said second detection wiring by second disconnected portions provided to said second element wiring other than said first crossing portions,
    each of the first disconnected portions is provided at a position between one of the first crossing portions and a second crossing portion in which portions of the first element wiring cross each other and which is adjacent to the one of the first crossing portions along the first element wiring, and
    the second element wiring is not provided to the first disconnected portions in the plan view, and the first element wiring is not provided to the second disconnected portions in the plan view.

7. A display apparatus comprising:
    a touch screen; and
    a display panel on which said touch screen is mounted, wherein
    said touch screen includes:
        a substrate; and
        a mesh-like lower electrode and a mesh-like upper electrode that are disposed, on said substrate, with an insulating film therebetween, said lower electrode and said upper electrode have
first crossing portions where first element wiring of a mesh of said lower electrode and second element wiring of a mesh of said upper electrode cross each other in a plan view when viewed in a direction perpendicular to the substrate, said lower electrode includes:
mesh-like first detection wiring that is one of row-direction wiring and column-direction wiring; and
mesh-like first insulating wiring that is insulated from said first detection wiring by first disconnected portions provided to said first element wiring other than said first crossing portions, said upper electrode includes:
mesh-like second detection wiring that is the other one of said row-direction wiring and said column-direction wiring; and
mesh-like second insulating wiring that is insulated from said second detection wiring by second disconnected portions provided to said second element wiring other than said first crossing portions, each of the first disconnected portions is provided at a position between one of the first crossing portions and a second crossing portion in which portions of the first element wiring cross each other and which is adjacent to the one of the first crossing portions along the first element wiring, and the second element wiring is not provided to the first disconnected portions in the plan view, and the first element wiring is not provided to the second disconnected portions in the plan view.

* * * * *